Feb. 19, 1946.  R. H. PREWITT  2,395,143

RESILIENT MOUNT FOR AIRCRAFT

Filed Dec. 17, 1942  3 Sheets-Sheet 1

INVENTOR.
RICHARD H. PREWITT
BY James M. Clark

Feb. 19, 1946.   R. H. PREWITT   2,395,143
RESILIENT MOUNT FOR AIRCRAFT
Filed Dec. 17, 1942   3 Sheets-Sheet 2

INVENTOR.
RICHARD H. PREWITT
BY James M. Clark

Feb. 19, 1946. R. H. PREWITT 2,395,143
RESILIENT MOUNT FOR AIRCRAFT
Filed Dec. 17, 1942 3 Sheets-Sheet 3

*INVENTOR.*
RICHARD H. PREWITT
BY
James M. Clark

Patented Feb. 19, 1946

2,395,143

UNITED STATES PATENT OFFICE 2,395,143

RESILIENT MOUNT FOR AIRCRAFT

Richard H. Prewitt, Lansdowne, Pa., assignor to Kellett Aircraft Corporation, a corporation of Delaware Application December 17, 1942, Serial No. 469,347

15 Claims. (Cl. 244—18)

This invention relates to mounts and supports for rotating components and more particularly to resilient mounts for engines, propellers and the rotative wing systems of aircraft.

In aircraft construction it is frequently necessary to support rotational and vibratory masses and their driving mechanisms at appreciable distances from the structure comprising the fuselage or wing. These drive extensions are generally occasioned by the necessity of locating the rotative plane of the propeller or wing system at sufficient distances fore and aft of the wings, or fuselage, and in the case of helicopters and autogiros, above the wings or fuselage. These extended structures may be either cantilevered or of trussed construction and the absorption of their natural frequencies of vibration together with those of the rotating engine assembly, and/or the driven propeller or rotor, have presented numerous problems in vibration absorption.

In autogiro design and construction the natural pendular frequency of the rotor blades coupled with the stiffness of the pylon structure and other factors resulting from the specific design of the rotor system and its hinged relationship with respect to the axis of rotation, have contributed to an undesirable condition generally referred to as ground resonance. The above problems have been augmented to great extents in autogiro design due to the presence of two large masses of rotation spaced relatively closely in non-parallel planes. The novel mounting system of the present invention has overcome these and other objections and deficiencies which have not been completely removed by prior devices, and in addition has attained improved performance and results in the resilient support of both the engine and propeller assembly, as well as the rotor system of an autogiro.

The present invention comprises essentially the resilient support of the mast, pylon, or other cantilevered strut-like structure carrying the rotative components by means of resilient mounting units which serve to increase the flexibility of the propeller or rotor hub in a plane parallel to the disc of rotation of the propeller or rotor. The supporting system preferably includes the cantilevered support of the vibratory mass at one terminal of the strut, a flexible support permitting limited rocking movement at the other terminal and resilient supporting units intermediate the terminals. In an improved form of the present invention the mast supporting the rotative components is provided with a plurality of rigidly attached radial arms which are resiliently supported from the aircraft structure by means of intermediate concentric resilient sleeves or bushings. These resilient supports may be of a readily procurable rubber type forming cylindrical units into each of which the pylon or mast arms are inserted and bonded or attached and the outer portion of which is rigidly attached to the fuselage structure.

It is accordingly a primary object of the present invention to provide a resilient mount for a rotating aircraft component or mass which is of relatively simple construction requiring a minimum number of attachments between the rotatable assembly and the mast or pylon support. It is a further object to provide a simplified arrangement of such type that the installation and accessibility of the accessory equipment is simplified and facilitated, and the drag or resistance of the exposed portions of the supporting structure is correspondingly reduced.

It is also an object to provide a supporting structure in which the lesser number of parts or members required in its construction together with the more efficient manner in which the material can be made to perform its function results in a saving in both material and weight. It is also an important object of the present invention to provide a resilient support structure for rotatable components wherein the higher natural frequencies of these components are effectively absorbed and damped, and controlled such that desired low frequency characteristics only are developed in the structure. It is a further object to provide a mount in which the frequency period may be arranged as desired and in which the resilience of the mounting units is relatively great in the plane of rotation normal and radial with respect to the axis of rotation.

It is also an object to provide a resilient engine mount having a single attachment to the engine in which the installation or disconnection of the engine or its accessories is facilitated by the mount or support extending between, rather than being surrounded by, the accessories. It is a still further object to provide a resilient mount adapted for a pylon support which assists in overcoming the problem of ground resonance induced by the rotative wing system.

Other objects and advantages of the present invention will become apparent to those versed in the art after reading the following description and the accompanying drawings forming a part hereof, in which.

Figure 1:
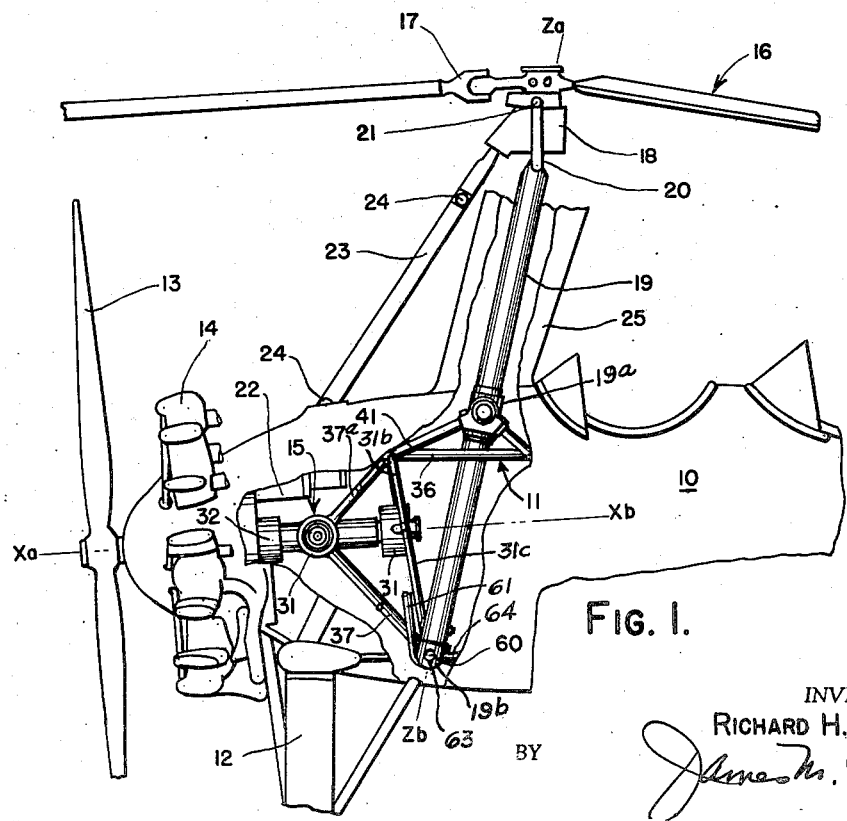
Fig. 1 shows a fragmentary elevational view of a rotative wing type aircraft to which the resilient mount of the present invention has been applied to both the engine-propeller and the rotative-wing assemblies.

Referring now to Fig. 1 the numeral 10 indicates the fuselage of an auto-rotative wing type aircraft having a structural framework 11 and a suitable landing gear indicated at 12. The aircraft is provided with a tractor propeller 13 driven by the radial engine 14, the engine-propeller assembly being supported from the framework 11 by the resilient mount assembly of the present invention as indicated at 15. The aircraft is also provided with a rotative wing system indicated generally by the numeral 16, pivotally attached as at 17 to the hub assembly 18 from which the aircraft is supported in flight by the cantilevered mast or pylon structure 19.

The engine 14 is provided with the usual engine accessories and has attached to the rear side thereof a housing indicated at 22 enclosing an engine starter, as well as a starter for the rotor system and a suitable clutch whereby the drive shaft 23 may be engaged with the engine 14 for the power drive of the rotor system 16. The rotor drive shaft 23 is provided with universal joints as at 24 and suitable splined couplings whereby tilting of the rotor system about the pivot 21 of the pylon yoke 20 is permitted. The pylon 19 and the controls extending from the fuselage to the rotor hub 18 are preferably housed in a suitable streamlined fairing indicated at 25. All of the heretofore described structure depicts a rotative wing aircraft of a well known type having a direct controlled rotor provided with a power drive for jump take-off, as more fully set forth in my co-pending application Serial No. 370,572, filed December 18, 1940.

Figure 2:
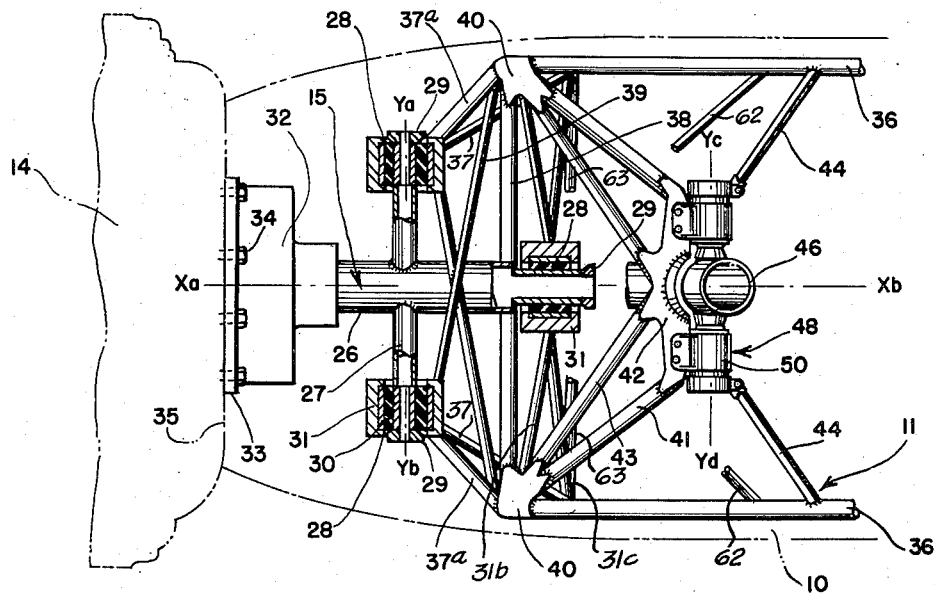
Fig. 2 is a fragmentary plan view of the resilient mounts shown in Fig. 1.

Referring to Figs. 1 and 2, it will be noted that the axis of the crankshaft of the engine 14 and the shaft for the propeller 13 is indicated by the lines of the longitudinal fore and aft axis Xa—Xb. In alignment with the axis Xa—Xb and concentrically disposed about the same is the engine mount assembly 15 comprising essentially a central cylindrical body portion 26 having laterally disposed arms 27 and a forward engine mount fitting portion 32. In the preferred modification shown the lateral arms 27 are horizontally disposed along the transverse axis Ya—Yb in the form of a cross tube, but other forms of the invention may include a single resilient unit encircling the tube 26, or a plurality of transverse radial arms may be provided with the units at the arm extremities. The outer extremities of the arms 27 have bonded thereto rubber annular bushings 28 beyond which the arms are provided with the enlarged portions 29. The outer surfaces of the annular bushings 28 are also bonded or otherwise adhered to cylindrical outer bushings 30 which are in turn retained within the cylindrical bores of the housing supports 31.

These housing supports for the resilient units 28 are rigidly supported from the fuselage framework 11 by the brace elements 37, and the diagonal braces 39 extending from the corner junction fittings 40 to the laterally disposed housing supports. Also, the laterally disposed housing supports are connected to the lower longerons by brace members 37. The rearwardly disposed housing support 31 is rigidly supported by the cross braces 31b extending from the corner junction fittings 40 and braces 31c extending from the lower longerons. The housing supports 31 are preferably of the split type to permit the removal in a forward direction of the engine mount assembly 15. The engine mount fitting 32 is rigidly attached to the front portion of the cylindrical body 26 and is provided at its forward face with a flange 33 through which the attachment bolts 34 engage the tapped holes in the engine mounting boss 35 for the support of the engine 14. The strut-like member 26 need not take the particular shape shown, but may be designed as a tapered main tube.

With the attachment fitting 32 rigidly fastened to the engine propeller assembly 13—14 the vibratory mass is entirely supported by the three resilient mounting units 28 within the fuselage supports 31 with their axes intersecting at 90 degrees and lying entirely within the substantially horizontal plane passing through the axes Xa—Xb and Ya—Yb. The resilient bushings 28 are preferably of a suitable known type whose spring rates are of known ratios about their various axes. With the preferred arrangement disclosed, and to which the applicant is not to be limited, the engine torque is directly transmitted to the arms 27 and the torsional vibrations about the axis Xa—Xb are absorbed in compression of the walls of the transversely disposed elastic bushings 28; the torsional vibrations at the same time subjecting the rearmost element 28 to rotational shear. The propeller thrust is also transmitted into compression forces against the walls of the lateral elastic bushings 28 and into axial shear at the rearmost central bushing 28. The angular oscillation of the power plant about an axis normal to the crankshaft passing through the center of gravity of the power plant will be absorbed and damped by compression, or shear, or a combination of the two, in the lateral resilient mounting elements depending upon the directional plane of the disturbing oscillations and will be absorbed essentially by the rear element by compression of its annular wall.

The construction of the engine mount support assembly 15 is preferably such that it provides a relatively rigid cantilever support for the engine providing adequate clearance and space about the assembly for the installation of the engine accessories. The engine mount support may be arranged such that more than two symmetrically and equidistantly disposed resilient lateral elements may be provided in the vertical transverse plane of the axis Ya—Yb. Such arrangements will also have the similar effect of reducing the natural frequencies of the propeller-engine assembly thereby greatly reducing the vibrations transmitted from these vibrating masses to the fuselage framework 11.

Figure 3:
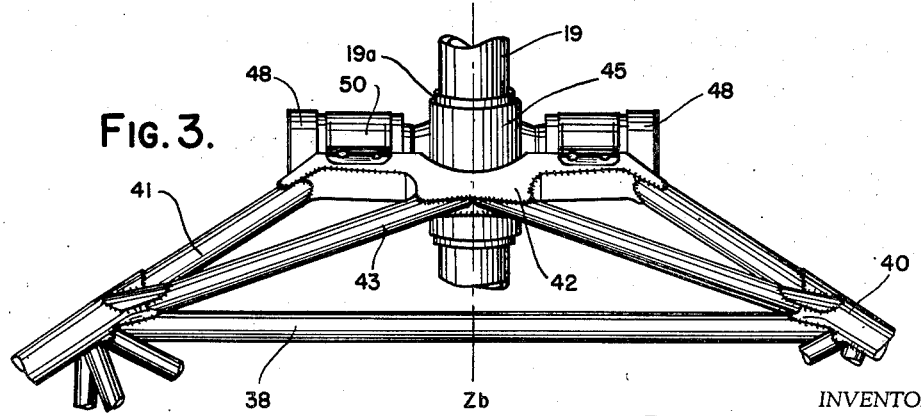
Fig. 3 is a front elevational view of the pylon support.

Referring now to Fig. 3, as well as to the arrangement of the pylon structure shown in Figs. 1 and 2, the pylon or mast 19 is preferably of tubular cross section and is supported intermediate its height by the resilient supporting assembly 45. The latter comprises essentially a tubular cross fitting having its main vertically disposed bore 46 of a diameter to closely engage the outer wall of the reinforced portion 19a of the pylon, and having transversely disposed arm or plunger portions 47 concentrically disposed about the axis Yc—Yd and supported within the resilient mounting units 48. The exterior elements of the resilient unit 48 are supported from the fuselage longerons 36 at the corner junction fittings 40, interconnected by the transverse members 38, by the main brace members 41 terminating in the gusset plate 42, the latter being additionally braced from its central portion by the braces 43. The outer extremities of the resilient units 48 are supported by the rear braces 44 which extend downwardly and rearwardly to connections with the longerons 36.

Figure 4:
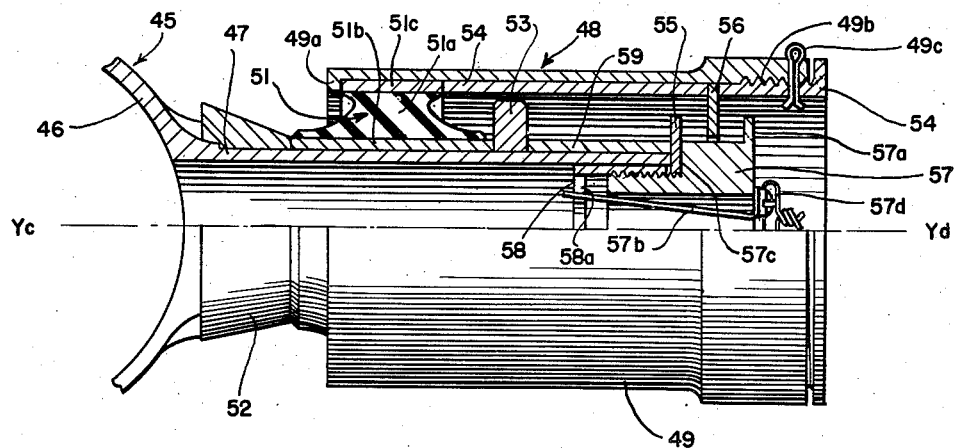
Fig. 4 is a part-sectional view taken along the lines 4—4 of Fig. 5.
Figure 5:
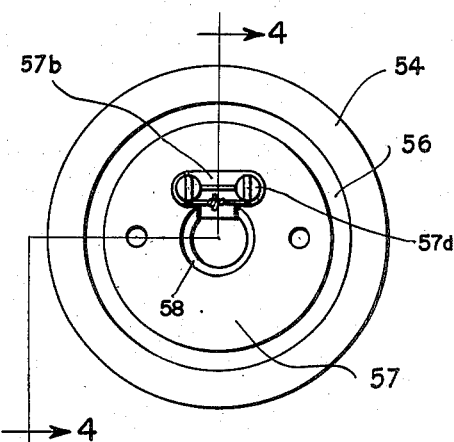
Fig. 5 is an end elevation of one of the resilient units.

The resilient support units 48 are shown in detail in Figs. 4 and 5 and comprise essentially an outer sleeve element 49 which is rigidly attached to the supporting structure gusset 42 by means of the clamp element 50. The inner bore of the outer sleeve 49 is of appreciably greater diameter than the cylindrical outside surface of the lateral arms 47 such that a resilient bushing 51, which may preferably be of the Lord type, is clampingly interposed between these elements and concentrically disposed about the lateral axis Yc—Yd. The elastic bushing 51 is of the well known type which comprises a rubber annulus 51a bonded to inner and outer sleeves or bushings 51b and 51c. A tapered collar 52 bearing against a shoulder at the inner intersection of the arms 47 with the hub 46, abuts and locates the inner sleeve 51b of the resilient bushing which in turn bears against the abutment ring 53 at its outer edge. The outer sleeve 49 is provided at its inner end with a flange 49a which limits inward movement of the bushing 51 and has its outer extremity threaded at 49b to receive the threaded retaining sleeve 54.

At the outer end of the arms 47 there is disposed a stop ring or washer 55 adapted by engagement with a like ring 56 of slightly larger diameter to limit the relative lateral movement along the axis Yc—Yd of the pylon assembly with respect to the fixed outer elements of the resilient unit 48 as imparted by the axial shear within the resilient unit 51. An inner threaded sleeve 58 is welded or otherwise fixed to the inner bore of the arm 47 and is in turn threadedly engageable by the flanged retaining element 57, the shoulder portion 57c of which bears against the stop ring 55 and is in turn provided with a flange at 57a engageable with the outer face of the abutment ring 56 for limiting axial movement in the opposite direction. A cylindrical spacing ring 59 is interposed between the abutment 53 and the stop ring 55 and the relative positions of the limit washers 55 and 56, and the flange 57a are maintained by the cotter pin 49c passing through the walls of the outer sleeve 49 and the threaded element 54, and also by means of the locking tongue 57b secured to retaining element 57 by screws 57d and received in slot 58a provided in sleeve 58.

It will be noted from the disclosed arrangement that the extent of compression of the elastic wall of the unit 51 is limited by the abutment ring 53, the outer diameter of which is caused to normally clear the inner bore of the outer cylindrical wall 54 by a predetermined distance. Similarly, the extent of the axial shear of the resilient unit 51 is determined by the spacing between the limit washers 55 and 56 and the flange 57a which are shown in Fig. 4 in their central undeflected positions in which ring 56 is equidistantly disposed between the adjacent stop elements.

I also contemplate that the engine-propeller assembly 13—14 may be supported from the framework 11 by reversing the resilient mount assembly generally indicated at 15. In this instance, the inner portion of cylindrical body 26 will be disposed within and rigidly supported by the fuselage framework 11 by suitable means including brace elements. The engine will be attached to the forward and axially disposed housing support 31 at the front end of the fuselage. Suitable bracing elements will extend from the transversely disposed housing supports 31 to the engine. This provides a rigid cantilever support for the engine with the axially disposed mounting unit 28 adjacent the engine, being subjected primarily to shear and the transversely disposed units to compression as previously described.

The pylon 19 is provided at its lower terminal with a load-taking connection 60 capable of transmitting the rotor load which substantially supports the aircraft in flight, the connection at the same time permitting of the limited movement of the pylon about the center of the fitting 60 along the axis Za—Zb and as limited by the abutment rings 53, 55, 56 and 57. The load-taking fitting 60 may preferably be of the pivoted or a part-spherical, ball and socket type, although it may take any detailed form which would serve its function of transmitting the tension developed in the pylon tube and transmitting the same to the fuselage framework 11 while permitting limited rocking about its center.

Figure 6:
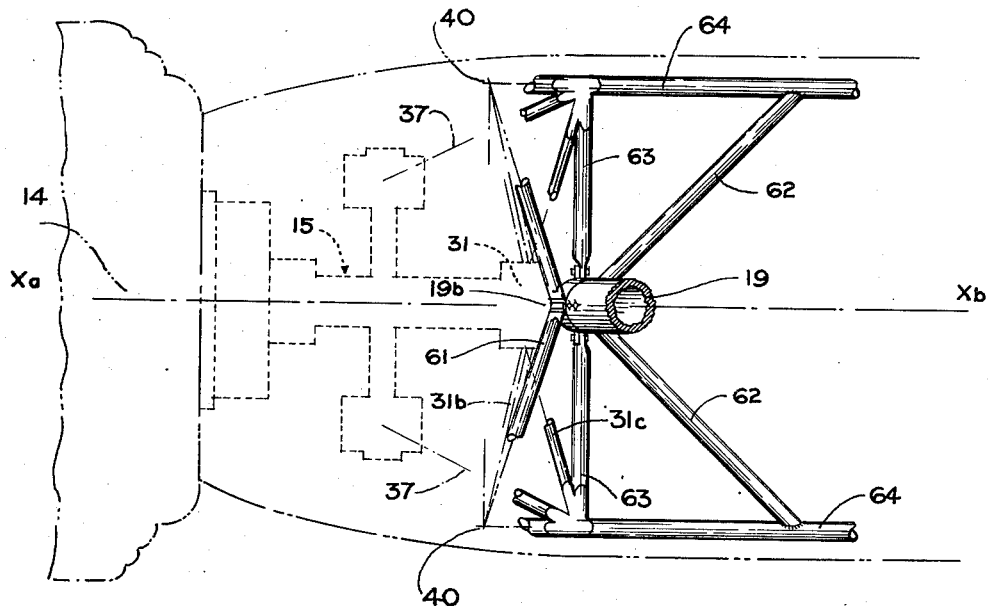
Fig. 6 is a fragmentary plan view of the lower pylon support and the adjacent fuselage structure.

Referring now to Fig. 6 in which there is shown a fragmentary plan view of the lower portion of the pylon 19 and adjacent framework, the centerline 60 of the ball and socket fitting is preferably at or about the elevation of the lower longerons 64 to which it is interconnected by the horizontal laterally extending tubular members 63. The socket supporting fitting 19b for the pylon is suitably provided with connecting lugs for the attachment of the transversely extending braces 63 as well as the horizontal rearwardly and outwardly diverging tubular braces 62. It is also provided with a suitable lug on its forward face, as more particularly shown in detail in Fig. 7, for the accommodation of the upwardly and outwardly extending tubular braces 61 which terminate at their upper ends at the previously mentioned junction of the upper longerons at 40. There is also indicated in Fig. 6 the upwardly and forwardly converging braces 31c which extend from the intersection of the lower longeron 64 and the transverse ties 63, upwardly to the resilient fitting 31 for the engine support. There is also shown in this figure a fragmentary portion of the corresponding upper braces 31b which extend from the resilient fitting 31 to the aforementioned station intersection at 40.

Figure 7:
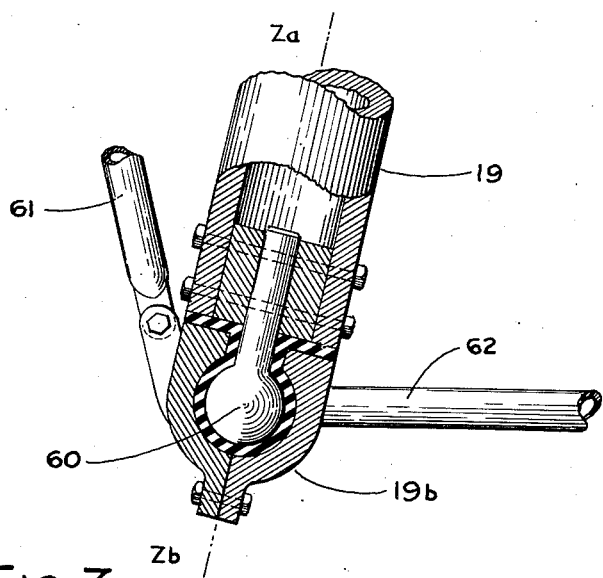
Fig. 7 is a sectional view of the lower pylon fitting.

The detail of the lower pylon pivot fitting 19b is shown in Fig. 7. The lower end of the pylon is preferably provided with a ball-end fitting having a pin portion extending into the pylon tube and suitably attached thereto by means of through bolts. This ball-end fitting is retained in the split socket fitting 19b which is provided with a resilient liner or bushing to provide the desired universal action within relatively small angular movements about the center of pivotation at 60. As referred to above, the tube cluster comprising the bracing members 61, 62 and 63 is suitably attached to the halves of the socket fitting 10b, or the cluster at the pivot junction can alternately be attached to a U-plate straddling the pylon structure and picking the same up by means of a single bolt or pin.

A detailed comparison of the resilient engine support with that of the pylon will develop a number of similarities in that both the pylon 19 and the engine support member 26 are supported within resilient units disposed laterally of their longitudinal axes and are each free to rock about a virtual point of support within certain predetermined limits. The universal fitting 60 also has its counterpart in the rear resilient unit of the engine mount assembly which permits similar rocking of the supporting cylinder about its center. The pylon 19 and the engine support cylinder 26 are also functionally similar in that they are both normally subjected to tension in carrying the lift and thrust respectively of their propeller systems, along the primary axes $Z_a$—$Z_b$ and $X_a$—$X_b$, respectively. In the disclosed arrangements it will be noted that the rotor has been mounted upon the fuselage framework in a manner generally similar to the mounting of the engine into the fuselage and that accordingly the natural frequency of the pylon strut has been reduced below that of the rotor frequency and thereby the vibrations which are normally transmitted from the rotor to the body have been greatly reduced. In prior radial methods of installing the rubber mountings these desired low frequency characteristics have been obtained only with difficulty. If desired, limiting stops similar to those on the pylon support could also be used on the units for the motor support.

Other modifications and advantages of the present invention both with respect to its general arrangement and detailed features which may become apparent to those skilled in the art after a reading of the foregoing specification are each intended to be embraced within the scope and spirit of this invention as more particularly defined in the appended claims.

I claim:

1. In a mounting system, a support structure, a vibratory mass, an elongated member extending along a primary axis, means to attach said mass to an outer extremity of said member, said member having transversely extending portions intermediate its length, and flexible means adapted for the support of said transverse portions and the inner extremity of said elongated member whereby the vibrations of said mass are transmitted in a lesser frequency to said support structure.

2. In a mounting system for rotatable aircraft components, a supporting framework, an elongated tubular member flexibly supported at one extremity within said framework, attachment means associated with an opposite extremity of said member adapted for the attachment of said rotatable component, said member having laterally extending portions intermediate its extremities and resilient means carried by said supporting framework for the support of said lateral portions.

3. In aircraft, a resilient mounting system comprising a supporting structure, an elongated tubular member flexibly supported at an inner extremity by said supporting structure, a vibratory body attached to the opposed extremity of said elongated member, laterally extending portions carried by said elongated member intermediate said extremities, and resilient rubber bushings interposed between said laterally extending portions and said supporting structure for the resilient support of said body.

4. In a mounting system for aircraft having a fuselage structure, a vibratory body, a strut-like member flexibly supported at one terminal within said fuselage structure, attachment means carried by the other terminal of said member for the attachment of said vibratory body thereto, laterally extending arm portions associated with an intermediate portion of said member, and resilient means interposed between said arm portions and said fuselage structure adapted to absorb oscillations both axially and transversely of said strut-like member.

5. In an aircraft mounting system including a fuselage structure, a supporting frame in the form of a coplanar cross framework, a vibratory component attached to one terminal of said cross framework, and flexible connections between the remaining three terminals of said cross framework and said fuselage structure adapted to form a flexible cantilevered support for said vibratory component.

6. In a mounting system for aircraft, a support structure, a vibratory mass, a strut-like member extending along a primary axis having a portion extending transversely to said axis, means to attach said mass to an outer extremity of said member, flexible means for the attachment of the opposed inner extremity of said member to said support structure, and resilient means disposed between said transverse portion of said member and said support structure adapted to provide a resilient cantilevered support for said mass.

7. In aircraft, a resilient support for an engine comprising a fuselage framework having a longitudinal axis, a supporting assembly comprising an axially extending supporting element and a plurality of tubular elements extending radially from the longitudinal axis of said first element, attachment means at the extremity of one of said first elements for the support of said engine and flexible means connecting said fuselage framework and the opposite extremity of said first element and the extremities of said tubular elements whereby said engine is flexibly supported from said framework fuselage.

8. In an aircraft engine mounting system, a fuselage framework, an elongated structural member extending substantially in the direction of the longitudinal axis of the aircraft, said member resiliently supported at its rear terminal portion within said fuselage framework, attachment means associated with a forward portion of said member for the attachment of the engine thereto, said member having laterally extending horizontal portions intersecting said longitudinal axis intermediate said terminal portions and resilient means interposed between said fuselage framework and said laterally extending portions for the resilient support of said engine.

9. In an aircraft, an engine mounting system including an aircraft framework, an elongated structural member extending in the direction of the longitudinal axis of the aircraft, a flexible support for said member at one of its terminal portions within said framework, attachment means associated with an opposite portion of said member for the attachment of the engine thereto, said member having a plurality of radially extending transverse arm portions intersecting said longitudinal axis intermediate said terminal portions and resilient means interposed between said framework and said arm portions extremities for the resilient support of said engine.

10. In aircraft, a pylon, a pylon supporting structure for said pylon element, a fuselage framework, a rockable connection between the lower portion of said pylon and said fuselage framework, laterally extending arm portions associated with an intermediate portion of said pylon and elastic bushings interposed between said arm portions and said fuselage framework for the resilient support of said pylon.

11. In an aircraft pylon support including a pylon, a fuselage framework, a tubular cross element having a central bore adapted to receive said pylon, said element having transversely disposed arm portions, sleeve elements fixedly attached to said fuselage framework disposed in such manner that they are co-axial with and spaced around said arm portions, resilient shear units interposed in the space between said arm portions and said sleeve elements adapted to resiliently oppose movement of said pylon with respect to said fuselage framework.

12. In an aircraft pylon support including a pylon, a fuselage framework, a tubular cross element having a central bore adapted to receive said pylon, said element having transversely disposed arm portions, sleeve elements fixedly attached to said fuselage framework disposed in such manner that they are co-axial with and spaced around said arm portions, resilient shear units interposed in the space between said arm portions and said sleeve elements adapted to resiliently oppose movement of said pylon with respect to said fuselage framework, and means carried by said arms and said sleeves to limit the relative movement between said pylon and said fuselage structure.

13. In aircraft, a pylon element, a pylon supporting structure for said pylon element, a fuselage framework, a ball and socket connection permitting limited rocking action between the lower portion of said pylon and said fuselage framework, laterally extending arm portions associated with an intermediate portion of said pylon and elastic bushings interposed between said arm portions and said fuselage framework for the resilient support of said pylon.

14. In a supporting arrangement for a rotary wing system including a supporting framework, an inclined cantilevered pylon member flexibly supported at its lower extremity within said framework in a support permitting limited rocking action, journal means associated with the upper extremity of said pylon member adapted for the rotational support of a rotary wing system, said pylon member having laterally extending portions intermediate its said extremities, means for absorbing and damping the vibration effects of the rotary wing system comprising resilient elements interposed between said supporting framework and the outer extremities of said lateral portions of said pylon.

15. Means for resiliently interconnecting the elements of a rotor mounting system for a rotative wing including, a supporting structure, an inclined cantilever member extending along a primary axis, means to rotatably support a rotative wing upon an upper extremity of said cantilever member, said cantilever member having transversely extending portions intermediate its length, comprising flexible elements adapted for the resilient support of said transverse portions from said supporting structure, and a flexible support connection for the lower extremity of said inclined member to said supporting structure arranged to permit limited rocking action whereby vibrations set up in the rotative wing are transmitted in a lesser frequency to said supporting structure.

RICHARD H. PREWITT.